W. W. Dutcher.
Loom Temple.

Nº 53,423.    Patented Mar. 27, 1866.

Witnesses
O. P. Hale Jr.
G. H. Washburn

Inventor
Warren W. Dutcher.

by his attorney.
R. Wesby

UNITED STATES PATENT OFFICE.

WARREN W. DUTCHER, OF MILFORD, MASSACHUSETTS.

IMPROVEMENT IN ROLLER-TEMPLES FOR LOOMS.

Specification forming part of Letters Patent No. 53,423, dated March 27, 1866.

*To all whom it may concern:*

Be it known that I, WARREN W. DUTCHER, of Milford, in the county of Worcester and State of Massachusetts, have made a new and useful Invention or Improvement having reference to Roller-Temples for Looms for Weaving; and I do hereby declare the same to be fully described in the following specification and represented in the accompanying drawings, of which—

Figure 1:
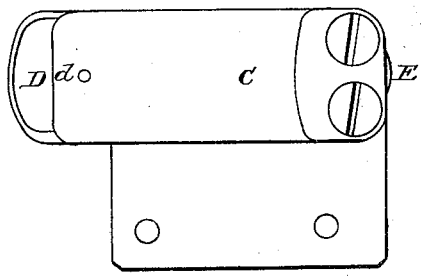
Figure 3:
Figure 2:
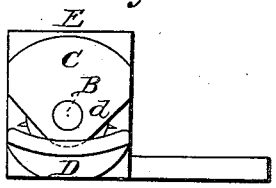

Figure 1 is a top view, Fig. 2 an elevation, and Fig. 3 a longitudinal section, of a roller-temple provided with the said invention.

Heretofore, in constructing the roller-temple of the kind on which a patent, No. 37,954, and bearing date the 24th day of March, A. D. 1863, was granted to me, it has been generally customary to screw the spindle of the roller into the cap thereof, the screw of the spindle being set at one end of it, while the head of the spindle was arranged at its opposite end, and so as to bear against the standard for supporting the cap; or, instead of this, the spindle, formed with its head at one end and screw at the other, has been run through the vertical extension of the cap and been screwed into the standard.

The drawings of my said patent represent the spindle as made without any head and run through the extension and screwed into the standard. My present invention has no reference to the latter application and construction of the spindle, but refers entirely to a headed spindle. In consequence of this the contractile force exerted by the spindle while the spindle may be in the act of being fixed firmly in place tends to draw the cap down so as to deflect the spindle and its roller out of a horizontal position or out of parallelism with the trough, whereby the points of the teeth of the roller are often brought into contact with the said trough, in which case either such points will become worn and blunted or the roller will be prevented from being freely revolved on the spindle. The difficulties resulting from such application of the spindle to the roller-cap have proved, in practice, very serious, and I obviate them by arranging the screw next to the head of the spindle, or by so applying the spindle and its screw and head to the standard and the cap that during the act of setting up the screw there shall be no such contractile or other strain produced by the spindle as may tend to draw the cap downward or throw the spindle out of parallelism with the trough, as set forth.

In the drawings, A denotes the roller; B, the spindle; C, the cap; D, the trough, and E the standard, which projects up from the trough and sustains the cap, such cap being screwed to the top of the standard.

The spindle B, I form with a male screw, $a$, close to its head $b$, the said screw being to enter a corresponding female screw, $c$, cut in the standard E. I also insert the spindle into the extension $d$, or that part of the cap which projects down alongside of the end of the roller. Thus, while the cap aids in supporting the spindle, it cannot be drawn downward by the spindle while the latter may be in the act of being screwed firmly into place, for the standard E will receive all the strain induced by the confining-screw and head of the spindle.

The spindle made with the screw arranged next its headed or nicked end may screw into the extension $d$ of the cap and simply extend into the standard without being screwed into the latter, the principle of my invention being the application of the headed spindle to the cap and the standard in such manner that by the setting up of the screw of the spindle there shall be produced no strain on the cap tending to draw it downward.

I therefore do not claim the arrangement of the head and screw of the spindle at opposite ends of it and with respect to the standard and the extension of the cap, so that on setting up the screw a strain on the cap may be produced tending to draw such cap and the spindle downward out of parallelism with the trough; but

I claim as my invention—

My improved application or arrangement of the headed spindle and its fastening-screw with reference to the cap-extension and the standard E for supporting the cap C, the spindle, under such application, being screwed into one and being free to move lengthwise in the other of such parts $d$ E while the fastening-screw is in the act of being set up, the whole being so that there may be no such force exerted by the spindle on the extension of the cap as will operate to draw the cap and spindle out of parallelism with the trough.

WARREN W. DUTCHER.

Witnesses:
H. B. STAPLES,
GEORGE W. JENNISON.